United States Patent [19]

Steger

[11] 4,367,052
[45] Jan. 4, 1983

[54] FLAT RATE SPRING PARTICULARLY ADAPTED FOR TYPEWRITER CARTRIDGES

[75] Inventor: Donald J. Steger, Corinth, Ky.

[73] Assignee: International Business Machines Corporation, Armonk, N.Y.

[21] Appl. No.: 154,681

[22] Filed: May 30, 1980

[51] Int. Cl.³ .............................................. B41J 33/14
[52] U.S. Cl. .................................... 400/208; 400/228; 400/434.2; 267/167
[58] Field of Search ...................... 400/208, 696, 697.1, 400/228, 434.2; 267/167

[56] References Cited

U.S. PATENT DOCUMENTS

| | | | |
|---|---|---|---|
| 2,647,743 | 8/1953 | Cook | 267/1 |
| 2,682,931 | 7/1954 | Young | 188/1 |
| 3,604,549 | 9/1971 | Caudill et al. | 400/228 X |
| 3,738,634 | 6/1973 | Foster | 267/156 |
| 3,743,267 | 7/1973 | Guerster et al. | 267/74 |
| 3,774,896 | 11/1973 | Rode | 267/167 X |
| 3,964,736 | 6/1976 | Huhnen | 267/166 |
| 3,974,708 | 8/1976 | F'Geppert | 74/242.1 A |
| 4,010,839 | 3/1977 | Guerrini et al. | 400/208 X |
| 4,247,210 | 1/1981 | Kacmarcik et al. | 400/697.1 X |

FOREIGN PATENT DOCUMENTS

| | | | |
|---|---|---|---|
| 2736402 | 2/1979 | Fed. Rep. of Germany . | |
| 2391853 | 12/1978 | France | 400/208 |
| 55-40333 | 3/1980 | Japan . | |
| 752489 | 7/1956 | United Kingdom . | |
| 555242 | 6/1977 | U.S.S.R. | 267/167 |

OTHER PUBLICATIONS

Spring Design and Applications, "The Negative Spring", Cook et al., McGraw Hill-Nicholas P. Chironis, Copywright 1961, pp. 161-165.

Primary Examiner—Ernest T. Wright, Jr.
Attorney, Agent, or Firm—William J. Dick

[57] ABSTRACT

Disclosed is a spring operating beyond the elastic limit of the material of which it is constructed, the spring including a length of resilient material having terminal end portions and a central body portion, one of the terminal end portions being adapted for connection to a first member. A convoluted portion of the resilient material has a central axis substantially perpendicular to the body portion and is adapted for connection to a second member, at least the convoluted portion being dimensioned so that upon separation of the first and second members due to a predetermined load, the convoluted portion uncoils and is stressed beyond the yield point of the material so that a substantially constant load placed on the convoluted portion by member separation effects further uncoiling of the convoluted portion.

9 Claims, 6 Drawing Figures

FIG. 1
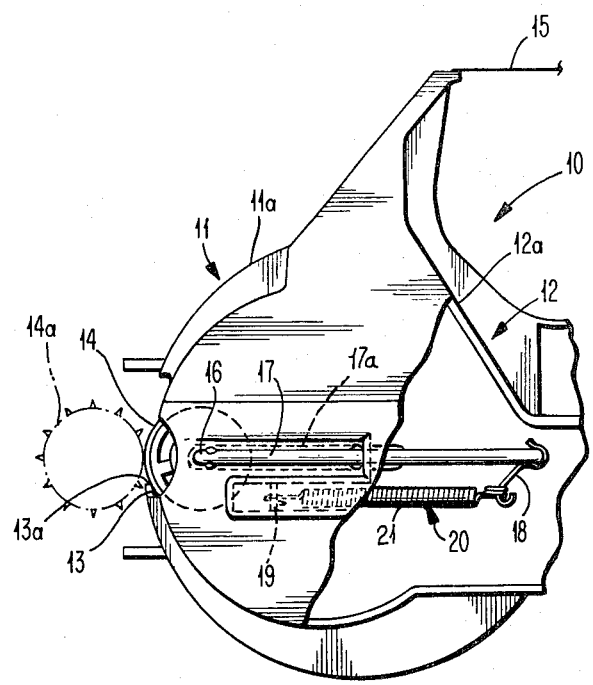
FIG. 2A
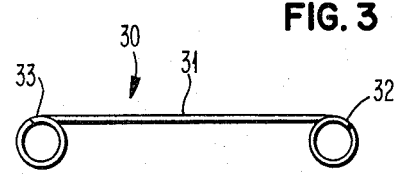
FIG. 2
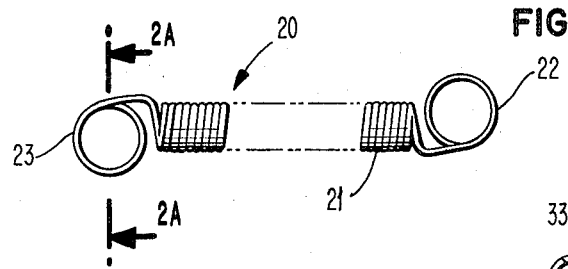
FIG. 3
FIG. 4
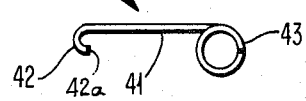
FIG. 5
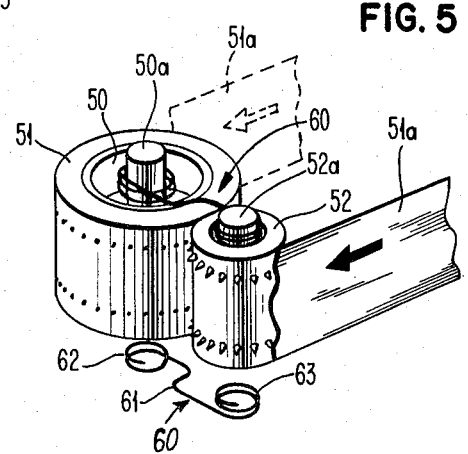

FLAT RATE SPRING PARTICULARLY ADAPTED FOR TYPEWRITER CARTRIDGES

SUMMARY OF THE INVENTION AND STATE OF THE PRIOR ART

The present invention relates to special purpose springs having a zero or flat rate when in operation, and more particularly a spring which is useful in a typewriter cartridge to maintain uniform loading of, for example, the ribbon take up spool against the driving member so that during operation of the take up spool, no further load increase is necessary to effect displacement of the take up spool because of a diameter increase of the spool due to ribbon being wound thereon.

In United States patent application Ser. No. 801,286, filed on May 27, 1977 of John O. Schaefer is disclosed a typewriter cartridge and cartridge assembly employing separate spring biased take up spools for each of a typewriter ribbon and erase cartridge. Each of the take up spools is biased towards a peripheral opening in the case of the cartridge so that once the cartridge is in position in the typewriter mechanism, the take up spool engages a spiked driver which operates against the biasing action of the spring, moves the spool slightly away from the peripheral opening in the cartridge case, and effects feed of the ribbon or erase ribbon allowing the proper pressure to be applied against the take up spool by the spiked driver. In the cartridge design disclosed therein, one end of the biasing spring (which operates in tension) is connected to the case and the opposite end is connected to a depending terminal end portion of a rod, the opposite depending terminal end portion passing through and acting as an axis of rotation for the take up spool. The depending terminal end of the rod remote from the take up spool is spaced from the supply spool a sufficient distance such that when pressing the take up spool inwardly as by the operator pressing the take up spool by finger motion inwardly into the cartridge, the remote terminal end of the rod will strike the supply spool limiting the amount of tension that may be applied to the spring so that it is not over stressed. However, inasmuch as the take up spool grows in size (diameter) during usage of the typewriter ribbon, which effects an inward depression of the spool and an increase in tension on the spring, that spring is designed so that a certain amount of yield takes place and the spring has an operating portion in its over stressed condition. While such a condition for operation is satisfactory, differences in loading of and against the spiked driver and the take up spool has resulted in isolated feed problems of certain very thin ribbon material.

In view of the above, it is a principle object of the present invention to provide a loading spring (biasing spring) particularly adapted for use in a typewriter and the like ribbon cartridges in which upon a predetermined load being placed upon the take up spool by a driver, whether it be located interiorly of or exteriorly of the cartridge, will operate at a uniform or substantially flat rate such that no increase in load is required to effect further separation between the driver and the take up spool.

It is recognized that either accidentally or on purpose other springs have been manufactured which have a dual loading rate, i.e. partial operation under elastic conditions (i.e., within the elastic limit of the material of the spring) and a portion of their operation outside the elastic limit. For example, in U.S. Pat. No. 3,774,896 is disclosed a dual rate cylindrical compression spring in which a convoluted tubular member, when axially compressed, permits the flanges of the tubular member to flex inwardly under elastic conditions until the parts confining the member engage the ends of the axially outermost convolutions. After a first period of elastic deformation, the member commences to undergo plastic deformation in the convoluted portions thereof whereby constant load characteristics are substantially maintained.

It is another object of the present invention to provide a novel spring which may be operated substantially under plastic (non-elastic) load conditions when it is desired to provide a bias between a pair of members which are to be operated in a mode to be separated, and substantially uniform loading is required.

Other objects and a more complete understanding of the invention may be had by referring to the following specification and claims taken in conjunction with the accompanying drawing.

DESCRIPTION OF THE DRAWING

FIG. 1 is an enlarged fragmentary sectional view in plan of a portion of a typewriter cartridge similar to that disclosed in Serial No. 801,286 of John O. Schaefer, filed on May 27, 1977 and incorporating a spring constructed in accordance with the present invention;

FIG. 2 is an enlarged fragmentary plan view of the spring illustrated in FIG. 1;

FIG. 2a is a fragmentary sectional view taken along line 2a—2a of FIG. 2;

FIG. 3 is another embodiment of the spring illustrated in FIGS. 1–2a;

FIG. 4 is still another embodiment of the spring disclosed in FIGS. 1–2a; and

FIG. 5 illustrates another embodiment of a cartridge employing the spring of the present invention and still another spring embodiment.

Referring now to the drawing, and especially FIG. 1 thereof, a fragmentary plan view of a cartridge assembly 10 including a ribbon cartridge 11 and erase cartridge 12 are illustrated therein. The cartridge assembly 10 and construction of the cartridges 11 and 12 may be found in U.S. patent application Ser. No. 801,286, filed on May 27, 1977 to John O. Schaefer, a division of which is now U.S. Pat. No. 4,302,118, issued on Nov. 24, 1981, and it is herein incorporated by reference. Suffice that each of the cartridges 11 and 12 includes a case 11a, 12a having a peripheral opening therein such as the opening 13 illustrated in the erase cartridge 12 into which opening 13 is biased a take up spool 14 for engagement with a spiked driver 14a (shown in dotted lines) which is mounted in the typewriter and which serves to bias the take up spool 14 inwardly or to the right in FIG. 1 and impart rotation thereto to effect take up of a ribbon or the like 15 during use of the cartridge assembly 10 in the typewriter. The take up spool 14, when biased inwardly away from the terminal edge 13a of the opening 13 is free to rotate on an axle formed from a depending terminal end 16 of a rod 17 which extends axially of the cartridge 12 and is slidable in a groove 17a in the opposite face of the cartridge case 12a. Biasing of the rod 17, and thus the spool 14 is accomplished by a spring 20, constructed in accordance with the present invention, and which is connected as by a hook 18 to one terminal end 16 of the rod 17 and to a lug 19 in the cartridge case 12a at its opposite end. It is obvious that as more ribbon 15 is wound upon the take up spool 14, the diameter of the take up spool 14 grows causing the rod 17 to be urged against the biasing of the spring 20 to the right. In accordance with the invention, the spring 20 is operated beyond the elastic limit of the material of which it is constructed so that as the spool 14 grows due to successive layers of the ribbon 15 being wound thereupon, no additional load is required to effect movement of the spool 14 to the right or inwardly of the case 12a of the cartridge 12 in order to effect proper loading between the driver 14a and the take up spool 14. To this end, and referring first to FIG. 2, the spring 20 includes a central body portion 21, each of the terminal ends 22, 23 of the spring 20 comprising a convoluted portion of the resilient material and having a central axis which is substantially perpendicular to the axis of the body portion 21, the convoluted portions 22 and 23 being adapted for connection to first and second members respectively, in the present instance and with reference to FIG. 1 the convoluted portion or terminal end 22 being adapted to be connected to the hook 18, and the convoluted portion or terminal end 23 being adapted for connection to the lug 19. The convoluted portions 22 and 23 of the spring 20 are dimensioned so that upon separation of the first and second members (hook 18 and lug 19) due to a predetermined load the convoluted portions 22 and 23 uncoil and are stressed beyond the yield point of the material whereby a substantially constant load placed on the convoluted portions 22, 23 caused by member separation effects further uncoiling of the convoluted portions 22, 23. Of course the length of deflection or the distance in the instance of FIG. 1 over which the load may be applied will depend upon the number of coils in the convoluted portions 22, 23.

It should be noted that in theory, at least, what appears to happen as the spring 20 extends and the terminal convoluted portions or ends 22 and 23 uncoil, is that individual segmental portions of the loop or convoluted portions 22, 23 forming the coil like ends exceed their elastic limit upon load application between the two members 18, 19 causing, if wire diameter and densities as well as structure is the same, substantially a constant load enabling constant deflection. However, as a practical matter, it is difficult to keep thin wire diameter exactly indentical all the way along its length, and in this connection as long s the load is substantially uniform that is all that is required. Moreover, even though the application of a load between the terminal ends or convoluted portions 22 and 23 of the spring 20 result in very near immediate uncoiling of the convoluted portions 22, 23, some resilience or spring tension remains and slight elasticity may be observed, although very minor.

In the preferred embodiment of the invention, illustrated in FIG. 2, some resilience is desired in order, when removing the cartridge (11 or 12) or cartridge assembly 10 from the typewriter mechanism, that the take up spool 14 is biased outwardly against the terminal edge 13a of the opening 13 to prevent inadvertent unwinding of the ribbon 15 from the take up spool 14. To this end, the body portion 21 preferably contains at least a portion thereof of a conventional helical extension spring having a loop diameter such that the predetermined load does not exceed the second spring portion or body portion elastic limit when the members are displaced to effect the uncoiling of the convoluted end portions 22 and 23.

The approximate load P required to yield the spring wire during the zero spring rate portion of the load versus deflection plot may be calculated using the following imperical formula.

$$Z = \frac{16PD}{\pi d^3} (.5) K1 + \frac{4P}{\pi d^2}$$

where:
Z = the yield stress in tension (psi)
P = load (lb.)
D = mean diameter of the convolted portions 22, 23 (inches)
d = wire diameter (inches)
K1 = stress concentration factor for torsion springs.

It should be noted that the spring 20 may be made from any commonly used spring material with a temper sufficient to permit the wire to yield. Some typical spring wire materials are music wire, high carbon wire, oil tempered wire and hard drawn wire, but the invention is not limited to these specific examples.

Another embodiment of the invention is illustrated in FIG. 3 wherein a spring 30, constructed in accordance with the present invention, is illustrated. The spring 30, in the illustrated instance, includes a body portion 31 with opposite terminal ends 32 and 33 respectively being composed of convoluted portions of the resilient material, the convoluted portions or terminal ends 32 and 33 having a central axis substantially perpendicular to the body portion 31 and adapted for connection to respective members 18, 19 which are to be separated under a predetermined load whereby the convoluted portions 32 and 33 uncoil and are stressed beyond the yield point of the material so that the load or force necessary to displace the members 18, 19 or separate the members 18, 19 connected to the spring 30 remains substantially constant.

In FIG. 4 is still another embodiment of a spring 40 constructed in accordance with the present invention, the spring 40 including a body portion 41, one of the terminal ends 42 including means, in the present instance a hook 42a, for connection to a first member 18, and the other of the terminal ends 43 including a convoluted portion also having a central axis substantially perpendicular to the body portion 41 and for connection to a second member 19 so that upon separation of the first and second members 18, 19 due to a predetermined load, the convoluted portion 43 uncoils and is stressed beyond the yield point of the material so that a substantially constant load placed on the convoluted portion 43 by member separation effects further uncoiling of the convoluted portion 43.

It should be noted that the embodiments in FIGS. 3 and 4 provide for minimal recovery upon load release, and would be utilized in systems or in cartridges wherein there is no advantage in effecting a resilient biasing action between the two members 18, 19 upon load release.

The cartridge embodiment illustrated in FIG. 5 includes a take up spool 50 having a layer of ribbon or web like material 51 wound thereon, and a spiked driver 52 which is biased against the web 51 as by a spring 60 constructed in accordance with the present invention. In this instance, the cartridge includes both the spiked driver 52 and the take up spool 50, the spiked driver 52 receiving its drive through, for example, a coaxial drive shaft (not shown) on the typewriter. The web or ribbon 51a may be wound around the spiked driver 52 in the direction shown by the solid or dotted lines, as desired. The spring 60 includes a body portion 61 and convoluted terminal end portions 62 and 63 respectively, in the illustrated instance the end portions 62 and 63 being wound in opposite directions about the shafts 50a and 52a of the take up spool 50 and spiked driver 52 respectively. To better visualize this wrapping, the spring 60 is also shown adjacent the spool 50 and driver 52 but in a flipped over condition. As before, as the diameter of the supply spool 50 grows due to the wrapping thereon of the ribbon 51a, the loops or convoluted portions 62 and 63 tend to uncoil, due to the predetermined load of separation, the convoluted portions 62, 63 being pressed beyond their elastic limit or yield point so that a substantially constant load is placed intermediate the spool 50 and spiked driver 52, and no further force is necessary between the two members (shafts 50a, 52a) to effect uncoiling of the convoluted portions 62, 63.

Thus the present invention provides for a very simple spring which is useful for operation of and between two members at a substantially constant load rate to inhibit the necessity of an increase in load as the members grow further apart or are separated.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed.

What is claimed is:

1. A ribbon cartridge for a typewriter, said cartridge including a case and a ribbon extending externally of said case;

a take up member for said ribbon in said case, said take up member comprising a ribbon take up spool mounted for rotation and translation in said case and for effecting a winding of layers of ribbon thereon, and a drive member for engagement with the periphery of said ribbon take up spool;

and biasing means for biasing said take up member against said drive member, said biasing means comprising a spring under tension for operation beyond the elastic limit of the material of which said spring is constructed, said spring comprising a length of resilient material having terminal end portions and a central body portion, one of said terminal end portions including means for connection to one of said case and members;

the other of said terminal end portions comprising a convoluted portion of said resilient material having a central axis substantially perpendicular to said body portion and for connection to one of the other of said case and members, at least said convoluted portion being dimensioned so that upon separation of said drive and take up members due to an increase in the diameter of said take up member caused by an increase in the layers of ribbon on said spool, said convoluted portion uncoils and is stressed beyond the yield point of said material whereby a substantially constant and limited load placed on said convoluted portion by separation of said drive and said take up members effects further uncoiling of said convoluted portion.

2. A cartridge in accordance with claim 1 wherein said body portion of said spring includes a spring portion which is displaceable upon separation of said drive and take-up members, but which is dimensioned so that said separation does not exceed the elastic limit of said spring portion.

3. A cartridge in accordance with claims 1 or 2 wherein said drive member comprises a spiked driver.

4. A cartridge in accordance with claims 1 or 2 wherein said means for connection to one of said case and member comprises a second convoluted portion of said resilient material.

5. A cartridge in accordance with claim 1 wherein said convoluted portion is connected to said take up member.

6. A cartridge in accordance with claim 5 wherein said means for connection to one of said case and members is connected to said case, a rod having a depending terminal end forming an axle for said take up member, said rod being mounted for sliding movement in said cartridge, and means on said rod for receiving said convoluted portion.

7. A cartridge in accordance with claim 5 wherein said means for connection to one of said case and members is connected to said drive member.

8. A cartridge in accordance with claims 6 or 7 wherein said means for connection to one of said case and members comprises a second convoluted portion of said resilient material.

9. A cartridge in accordance with claim 8 wherein said body portion of said spring includes a spring portion which is displaceable due to separation of said drive and take-up members but which is dimensioned so that said separation does not exceed the elastic limit of said spring portion.

* * * * *